3,481,963
ORGANOPOLYSILOXANES HAVING TERMINAL HYDROXYMETHYL GROUPS AND PROCESS THEREFOR
Walter Simmler, Odenthal-Schlinghofen, and Hans Niederprüm, Monheim, Germany, assignors to Farbenfabriken Bayer Aktiengesellschaft, Leverkusen, Germany, a corporation of Germany
No Drawing. Filed Mar. 25, 1966, Ser. No. 537,299
Claims priority, application Germany, Apr. 9, 1965, F 45,780
Int. Cl. C07f 7/02; C08g 41/04
U.S. Cl. 260—448.2                                8 Claims

ABSTRACT OF THE DISCLOSURE

Method of preparing methylpolysiloxanes having terminal hydroxymethyl groups and consisting of structural units of the formulae $$HO-CH_2-Si(CH_3)_2-O_{1/2} \text{ and } (CH_3)_n-SiO_{\frac{4-n}{2}}$$

wherein $n$ has a value of from 1 to 3, comprising reacting while stirring a mixture of 1,3-di-(hydroxymethyl)-tetramethyl disiloxane and methylpolysiloxane consisting of structural units of the formula:

$$(CH_3)_nSiO_{\frac{4-n}{2}}$$

wherein $n$ is as above defined, in the presence of from 0.2 to 1% by weight of the mixture of concentrated sulfuric acid at a temperature not exceeding 30° C. for from 2 to 5 hours, washing the resultant reaction mixture, drying the same and thereafter heating said mixture under a pressure of from 1 to 10 mm. Hg to a temperature not exceeding 100° C.

---

This invention relates to organopolysiloxanes, and is especially concerned with a method of producing linear and branched organopolysiloxanes in the terminal siloxane units of which hydroxymethyl radicals are bound to silicon. These organopolysiloxanes consist of structural units of the formulae $$HO-CH_2-Si(CH_3)_2-O_{1/2} \text{ and } (CH_3)_{n-a}(C_6H_5)_aSiO_{\frac{4-n}{2}}$$

in which $a$ is equal to 0, 1 or 2, $n$ is equal to 1, 2 or 3 when $a$ is 0 and $n$ is 2 when $a$ is 1 or 2.

Two methods are known for the production of compounds of this type, in which halomethyl silicon compounds are used and which differ in that in the one case bromoethyl compounds are immediately hydrolyzed with alkali metal hydroxides in the presence of methanol or ethanol, whereas in the other case a dimeric chloromethyl silicon compound is first converted with a metal acylate into the acyloxymethyl silicon compound, i.e. a di-(acyloxymethyl)-tetraorgano-disiloxane, which is then reacted in admixture with a diorganosiloxane polymer and an alchohol in the presence of a small amount of aqueous hydrochloric acid to form an α,ω-di-(hydroxymethyl)-poly-(diorganosiloxane).

However, when these methods are applied to the production of high molecular weight siloxanes with a comparatively small proportion of hydroxylated methyl radicals, i.e. especially with only terminal hydroxymethylsiloxane units, products are obtained which do not exhibit the expected hydroxyl content and the desired structure. With the first-mentioned method there occurs, in addition to the hydrolysis, i.e. the splitting of the C—Br bond, a splitting of Si—C and also of Si—O bonds, which increases as the temperature rises. The careful reaction at room temperature is still incomplete even after several days, and since higher polymers cannot be purified by distillation, halogen-containing residues remain in the final product of this process. If, however, the reaction is accelerated and completed by heating, the above-mentioned secondary reactions lead to a loss of hydroxyl groups and to siloxane condensations which modify the structure.

The second method mentioned above leads to faulty reactions the detailed investigation of which has given the following picture: When 1,3-di-(acetoxymethyl)-tetramethyl disiloxane is reacted at elevated temperature with a methyl polysiloxane and excess methanol in the presence of small amounts of hydrochloric acid (the HCl content of the methanol being, for example, 0.1 percent by weight), then the product contains 40% fewer hydroxyl groups than the amount calculated from the extensive reaction of the acetyl groups. Methoxy-siloxanes are formed with splitting of the Si—CH₂ bond, and from these result, inter alia, secondary products with an Si—O—CH₂—Si grouping. If the reaction is carried out with a larger amount of hydrochloric acid, the methanol having, for example, HCl content of 3 percent by weight, then the reaction of the acetyl group is, in fact, almost complete, but the content of hydroxymethyl groups in the product amounts only to somewhat more than half (e.g. 56%) of the calculated amount. The investigation showed the surprising result that Cl—CH₂—Si groups are predominantly formed in place of the missing hydroxymethyl groups.

Thus, the object of the present invention, viz. to obtain a sufficiently pure organopolysiloxane of the defined mean chain length, having substantially only siloxane units corresponding to the formula $$HO-CH_2-Si(CH_3)_2-O_{1/2}$$

as terminal members, in a manner which is also economically satisfactory, and which cannot be achieved by the known methods. On the other hand, such a predetermined uniform structure is necessary for application, for example, as intermediates for the manufacture of high molecular weight polyesters and polyurethanes.

It has now been found that this task can be accomplished by an equilibration reaction carried out under specific conditions, and according to the present invention there is provided a method of preparing organopolysiloxanes having terminal hydroxymethyl groups as defined above which comprises stirring a mixture of 1,3-di-(hydroxymethyl)-tetramethyl disiloxane and an organopolysiloxane consisting of structural units of the formula $$(CH_3)_{n-a}(C_6H_5)_aSiO_{\frac{4-n}{2}}$$

in the presence of concentrated sulphuric acid in an amount of at least 0.2 and not more than 1 percent by weight of the mixture, at a temperature not exceeding 30° C., and preferably at room temperature, for 2 to 5 hours, washing the reaction mixture, for example with water containing sodium chloride or sodium bicarbonate, drying the mixture, and finally heating the mixture under a pressure of from 1 to 10 mm. Hg to a temperature not exceeding 100° C. The numerical values $n$ and $a$ in the above formula are the same as defined hereinbefore. Preferably an amount of sulphuric acid between 0.4 and 0.7 percent by weight is used.

If, as usual in the known equilibration processes for the production of organopolysiloxanes, higher temperatures or higher acid concentrations are applied, then side-reactions occur, which can be analytically recognized by an intolerably high loss of hydroxyl groups. This is mainly caused by two reactions which are due to the esterification of HO—CH₂—Si groups with sulphuric acid: firstly, the Si—C bond thus strongly polarized is split by the action of the water originating from the esterification; and furthermore, by an etherification reaction which becomes noticeable at concentrations above 0.7 percent by weight $H_2SO_4$ and leads to chain lengthening according to the reaction scheme Si—CH$_2$—O—SO$_3$H+HO—CH$_2$—Si→
Si—CH$_2$—O—CH$_2$—Si+H$_2$SO$_4$ It was therefore not to be expected that, nevertheless, an extremely narrow range of concentration and temperature would exist, in which the side-reactions become insignificant, whereas the desired reaction still proceeds to an extent which is economically advantageous. It was, in fact, possible to prove by means of fractional extraction according to the method described in French patent specification No. 1,402,390, that the products obtained according to the invention contain neither unchanged dihydroxymethyl tetramethyl disiloxane nor polysiloxanes without HO—CH$_2$—Si groups and that the desired copolymerization products have thus been formed.

The following examples are given for the purpose of illustrating the invention.

EXAMPLE 1

82 grams 1,3-di-(hydroxymethyl)-tetramethyl disiloxane are mixed with 918 g. octamethyl cyclotetrasiloxane and 4 g. concentrated sulphuric acid and the mixture is stirred at 20° C. for 5 hours. The reaction mixture is then washed with twice its volume of an aqueous solution which is saturated with sodium chloride and contains twice the stoichiometric equivalent amount of sodium bicarbonate referred to the sulphuric acid employed. The oil phase is separated from the aqueous solution, mixed with one third of its volume of toluene and the separated water is removed. The toluene and residual water are then azeotropically distilled off from the oil and the residue is heated under a pressure of 2 mm. Hg up to 90° C. An α,ω-di-(hydroxymethyl)-poly-(dimethylsiloxane) remains as a colorless oil having a viscosity of 53 cst. at 20° C., the hydroxyl group content of which amounts to 1.4 percent by weight, in accordance with the theoretical value calculated from the formula

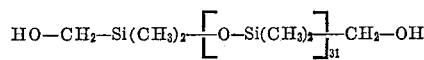

EXAMPLE 2

A methyl polysiloxane is prepared in known manner by hydrolyzing a mixture of 2322 g. dimethyl dichlorosilane and 149.5 g. methyl trichlorosilane with water. 79 grams of this hydrolyzate are mixed with 20.9 g. 1,3-di-(hydroxymethyl)-tetramethyl disiloxane and 0.4 g. concentrated sulphuric acid, and this reaction mixture is further treated as described in Example 1. The viscosity of the oil finally obtained amounts to 41 cst. at 20° C. and its hydroxyl group-content to 3.6 percent by weight, in accordance with the theoretical value calculated from the formula

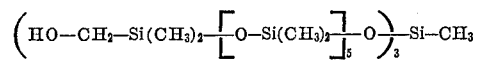

If this process is repeated with the sole modification that larger amounts of sulphuric acid are used, then oils are obtained which have a lower hydroxyl group-content and a correspondingly higher viscosity, as can be seen from the following table (percents are percent by weight, the viscosity is measured at 20° C.):
0.7% $H_2SO_4$: 3.3% OH 49 cst.
1% $H_2SO_4$: 3.1% OH 53 cst.
3% $H_2SO_4$: 2.8% OH 65 cst.
5% $H_2SO_4$: 1.6% OH 152 cst.

What we claim is:
1. An α,ω - di - (hydroxymethyl) - poly - (dimethylsiloxane) having the formula:

HO—CH$_2$—Si(CH$_3$)$_2$[O—Si(CH$_3$)$_2$]$_{31}$CH$_2$OH

2. A methylpolysiloxane having the formula:

(HO—CH$_2$—Si(CH$_3$)$_2$[O—Si(CH$_3$)$_2$]$_5$O)$_3$Si—CH$_3$

3. Process for the production of linear or branched methylpolysiloxanes having terminal hydroxymethyl groups and consisting of structural units having the following formulae:

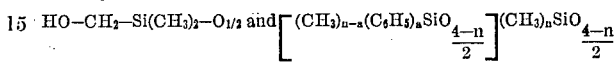

n is a number having a value of from 1 to 3, which comprises reacting under stirring a mixture of 1,3-di-(hydroxymethyl)-tetramethyl disiloxane and a methylpolysiloxane consisting of structural units of the formula:

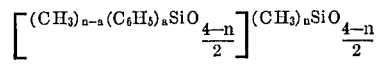

wherein n is as defined above in the presence of from 0.2 to 1% by weight of the mixture of concentrated sulfuric acid at a temperature not exceeding 30° C. for from 2 to 5 hours, washing the resultant reaction mixture, drying the same and thereafter heating said mixture under a pressure of from 1 to 10 mm. Hg to a temperature not exceeding 100° C.

4. Process according to claim 3 wherein said concentrated sulfuric acid is used in an amount of from 0.4 to 0.7% by weight of the reaction mixture.

5. Process according to claim 3 wherein said reaction is effected at room temperature.

6. Process according to claim 3 wherein said reaction mixture is washed with water containing sodium chloride and/or sodium bicarbonate.

7. Process according to claim 3 wherein said mixture comprises 1,3-di-(hydroxymethyl)-tetramethyl disiloxane and octamethylcyclotetrasiloxane.

8. Process according to claim 3 wherein said mixture comprises a mixture of the hydrolyzate obtained from a mixture of dimethyl dichlorosilane and methyl trichlorosilane with 1,3-di-(hydroxymethyl)-tetramethyl disiloxane.

References Cited

UNITED STATES PATENTS 2,909,548 10/1959 Bailey et al.
2,924,588 2/1960 Speier _____ 260—448.2 X
3,038,000 6/1962 Schmidt.
3,271,359 9/1966 Bluestein.

OTHER REFERENCES

Eaborn, "Organosilicon Compounds," Academic Press Inc., N.Y. (1960), pp. 255–257.

Bazant et al., "Organosilicon Compounds," vol. 1, Academic Press Inc., N.Y. (1965), p. 47.

TOBIAS E. LEVOW, Primary Examiner

P. F. SHAVER, Assistant Examiner

U.S. Cl. X.R.
260—482, 858